LEVEL CONTROL SYSTEM FOR A COMMUNICATION SYSTEM OF THE TYPE IN WHICH A PILOT SIGNAL IS COTRANSMITTED WITH INFORMATION SIGNALS BETWEEN AN INITIAL STATION AND A FINAL STATION

Filed Oct. 5, 1965 2 Sheets-Sheet 1

INVENTORS
NICOLAAS RODENBURG
WILLEM HERMES
BY
Frank R. Trifari
AGENT

LEVEL CONTROL SYSTEM FOR A COMMUNICATION SYSTEM OF THE TYPE IN WHICH A PILOT SIGNAL IS COTRANSMITTED WITH INFORMATION SIGNALS BETWEEN AN INITIAL STATION AND A FINAL STATION

Filed Oct. 5, 1965 2 Sheets-Sheet 2

INVENTORS
NICOLAAS RODENBURG
WILLEM HERMES

BY [signature]
AGENT

United States Patent Office 3,456,191
Patented July 15, 1969

3,456,191
LEVEL CONTROL SYSTEM FOR A COMMUNICATION SYSTEM OF THE TYPE IN WHICH A PILOT SIGNAL IS COTRANSMITTED WITH INFORMATION SIGNALS BETWEEN AN INITIAL STATION AND A FINAL STATION

Nicolaas Rodenburg and Willem Hermes, Hilversum, Netherlands, assignors, by mesne assignments, to U.S. Philips Corporation, New York, N.Y., a corporation of Delaware Filed Oct. 5, 1965, Ser. No. 493,120
Claims priority, application Netherlands, Oct. 6, 1964, 6411588
Int. Cl. H04b 3/06, 3/10
U.S. Cl. 325—2 12 Claims

ABSTRACT OF THE DISCLOSURE

A communication system of the type having an initial station and a final station interconnected by a transmission line which may include an intermediate station. Each station includes level control means. The initial station includes a pilot transmitter, and the final station includes a pilot receiver. The pilot receiver controls the level control means in the final station, and includes a control signal generator for generating a trivalent control signal responsive to the level of the received signal as above, within, and below predetermined limits. The control signal is returned by a return line to the initial station for effecting variation of a characteristic of the pilot signal. The initial and intermediate stations include means for detecting such characteristic variation of the pilot signal in order to control the corresponding level control means.

The invention relates to a communication system for the transmission of signals between an initial station and a final station through a transmission line, in which a pilot receiver is connected to the final station for level control by means of a pilot signal co-transmitted with the transmitted signals. The pilot receiver controls an adjustable level control impedance in the final station and also an adjustable level control impedance of at least one repeater station preceding the final station.

In such a communication system, the level control of the repeater station preceding the final station is accomplished by means of a level control voltage line. This line may be another transmission line of the communication system which is connected for communication in the opposite direction. While the construction of this type of communication system is simple, it is subject to interference. Signal transmission can thus be adversely affected by faults in the level control as well as in the signal transmission line, since a fault in the level control line can render the repeater station preceding the final station inoperative.

It is the object of the invention to provide a communication system, in which the above stated problem is avoided, and in which the system is simply fabricated and its operation is independent as much as possible of the components which are employed.

According to the invention in order to provide the level control for the repeater stations preceding the final station, the final station comprises a control generator with a control circuit connected to the pilot receiver in the form of a marginal supervision device. The control generator supplies, under the control of the marginal supervision device, a trivalent control signal through a control line to the initial station in accordance with the fact whether the pilot level lies above, between or below the two marginal supervision limits. In the initial station the control signal received through the control line controls a local level control signal generator provided with a memory which is connected to the transmission line for supplying the level control signal for the level control impedance of the repeater stations preceding the final station.

In order that the invention may more readily be practiced, it will now be described in greater detail, by way of example, with reference to the figures.

FIGURE 1 shows a unidirectional communication system according to the invention, while

FIGURE 1 shows a transistorized carrier telephony system 1 according to the invention for the transmission of signals through a coaxial line 2, in which through the coaxial line, for example, 960 speech signals in a frequency band of 60 kc./s.–4 mc./s., a television signal and the like are transmitted.

Figure 1:
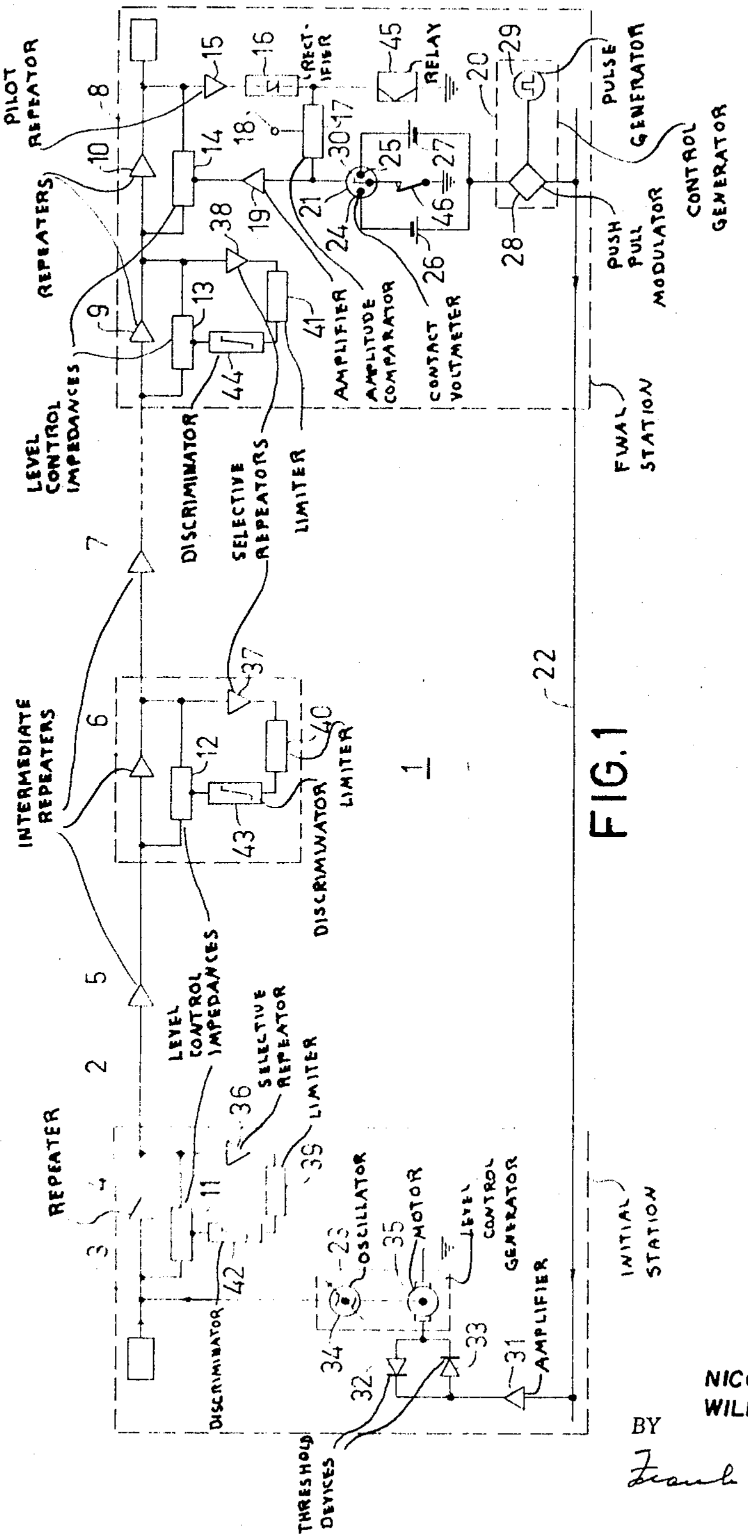

In the carrier telephony system, the carrier telephony signals originating from a carrier telephony initial station 3 with associated initial repeater 4, are applied through intermediate repeaters 5, 6, 7 to a carrier telephony final station 8, associated pre-repeater 9 and final repeater 10. The supply of the intermediate repeater station 5, 6, 7 which is not shown in the figure, is effected in known manner by means of a direct voltage supply which is applied, for example, from the carrier telephony initial station 3, to the coaxial line 2 together with the carrier wave telephony signals.

To compensate for variations in the level of the transmitted signals, which are caused substantially by damping variations in the coaxial line 2, resulting from variations in temperature, the initial repeater 4 in the carrier telephony initial station 3, the intermediate repeater 6, as well as the pre-repeater 9 and the final repeater 10 in the carrier telephony final station 8, are provided with a level control impedances 11, 12, 13 and 14 respectively constituted by a temperature-dependent resistor, for example, in the form of a thermistor or a small incandescent lamp, included in the negative feedback circuit of the repeaters 4, 6, 9 and 10 to the filament of which is applied a control current serving for level control. The intermediate repeater stations 5, 7 do not include level control devices.

For the level control of the repeaters 4, 6, 9 and 10, a pilot signal is co-transmitted along the coaxial line 2 with the carrier telephony signals. The pilot signal is applied to a pilot receiver connected to the carrier telephony final station 8. The pilot receiver is formed by the cascade arrangement of a selective pilot repeater 15 tuned to the pilot frequency followed by a rectifier device 16 and an amplitude comparison device 17 for comparing the amplitude of the output voltage of the rectifier device 16 with a constant reference voltage originating from the terminal 18, from which amplitude comparison device 17 the output voltage is applied to an amplifier 19 for further processing.

In this case the level control of the whole communication system is effected from the pilot receivers; in fact, for the level control in the final repeater 10, the output signal of the repeater 19 is directly applied from the pilot receiver to the adjustable level control impedance 14 of the final repeater 10, while for the level control of the repeaters 3, 6, 9 a level control signal is derived from the pilot receiver in a manner to be described below. This signal controls the adjustable level control impedances 11, 12, 13 in the negative feedback circuits of the repeaters 4, 6, 9. The level control is advantageously effected in the manner as described in copending U.S. patent application Ser. No. 431,642, filed Feb. 2, 1965 and now Patent No. 3,414,688. This application discloses a system in which the level control is designed so that a level deviation of opposite sense, (with respect to the level deviation at the carrier telephony final station 8, is effected in the output signal of the repeaters 4, 6 preceding the final station 8, and such that the output signal of the carrier telephony final station 8 is brought to a nominal level by the level control of the pre-repeater 9 as well as the final repeater 10. In this case the pilot signal is brought approximately to nominal level by the pre-repeater 9, while the accurate level control is effected by the final repeater 10.

According to the invention, for the level control of the repeaters 6, 9, the final station 8 is provided with a control generater 20 with a control circuit in the form of a marginal supervision device 21 connected to the amplitude comparison device 17 of the pilot receiver. The control generator 20 supplies, under the control of the marginal supervision device 21, a trivalent control signal through a control line 22 to the initial station 3, in accordance with the fact whether the pilot level is above, between or below the two marginal supervision limits. In the initial station 3 the control signal received through the control line 22 controls a local level control signal generator 23 which comprises a memory which is connected to the transmission line 2, for supplying the level control signal for the level control impedances 11, 12, 13 of the repeaters 4, 6, 9.

In the embodiment shown a contact voltmeter is used in the final station as a marginal supervision device 21, the terminal contacts 24, 25 of which are connected to the input circuit of the control generator 20 through lines which include direct voltage sources 26, 27 of positive and negative polarities respectively. The generator is formed by a pulse generator 29 connected to a push-pull modulator 28, in particular a ring modulator. In this case, the control generator 20 supplies a trivalent control signal in accordance with the fact, whether the pilot level lies above, between or below the two limiting values determined by the contact voltmeter 21. In fact, when the pilot level lies above or below the limiting values determined by the contact voltmeter 21, the grounded central contact 30 of the contact voltmeter 21 contacts the terminal contacts 24 and 25 respectively, as a result of which a positive and negative voltage respectively is applied to the control generator 20 so that a series of positive and negative pulses respectively are supplied by the control generator 20. In case the pilot level lies between the two limiting values, the central contact of the contact voltmeter 21 makes no contact with the terminal contacts 24, 25, as a result of which the control generator 20 transmits no pulses. The trivalent control signal is consequently formed by a series of positive pulses, a series of negative pulses or no pulses.

In the initial station 3 of the embodiment shown, the control signal received through the control line 22 is applied, after amplification in an amplifier 31, through the parallel arrangement of two threshold devices 32, 33 passing current in opposite directions to the level control voltage generator 23 which comprises a memory and which is formed by a frequency modulator consisting of a local oscillator 34 a control motor 35 connected to a frequency-determining element of the oscillator. In this case the control voltage generator 23 supplies a frequency-modulated level control signal in the band of 35–42 kc./s. which is applied to the coaxial line 2 for the level control of the repeater stations 4, 6, 9. In particular, the level control signal amplified in the various repeaters 4, 5, 6, 7, 9, on its way along the coaxial line 2, is selected in the repeaters 4, 6, 9 by means of selective repeaters 36, 37, 38 and applied to frequency discriminators 42, 43, 44 through limiters 39, 40, 41 to control the adjustable level control impedance 11, 12, 13.

The operation of the device shown will now be described in detail.

Starting from a given operating condition of the whole level control system, in which the level control impedances 11, 12, 13 of the repeater stations are adjusted at a given value by means of a level control signal of a given frequency of the level control voltage generator 21 in the initial station 3, and the level control impedance 14 of the final repeater 10 in the final station 8 is adjusted at a given value by the output signals of the pilot receiver, it is assumed that a pilot signal variation occurs which lies within the limiting values of the marginal supervision device 21. In this case no control pulses are applied by the control generator 20 in the final station 8 through the control line 22 to the control motor 35 in the initial station 3, as a result of which the control motor 35 remains in its assumed condition and no frequency variation is produced in the local oscillator 34 so that the level control impedances 11, 12, 13 in the repeaters 4, 6, 9 are not varied. In this case any small pilot signal variation occuring is entirely compensated by the final repeater 10 in the final station 8. This means that the small pilot signal variation which occurs causes such a variation in the value of the level control impedance 14 in the negative feedback circuit of the final repeater 10 that the pilot signal variation is completely counteracted by the negative feedback variation which occurs in the final repeater 10.

When, on the contrary, such a pilot signal variation occurs, that the upper limiting value of the contact voltmeter 21 is surpassed, a contact of the contact voltmeter 21 closes so that a series of positive control pulses is applied from the control generator 20 to the control motor 35 by way of the control line 22, the repeater 31 and the conductive threshold device. The motor 35 will consequently start rotating in a given direction, so that the frequency of the control voltage applied to the coaxial line 2 will vary, and consequently the value of the level control impedances 11, 12, 13 in the negative feedback circuit of the repeaters 4, 6, 9 will also vary. This condition continues until the pilot signal in the pilot receiver returns to a level between two limiting values of the contact voltmeter 21, so that the relative final contact of the contact voltmeter 21 is opened. The transmission of positive control pulses is thus stopped so that the control motor 35 in the initial station 3 also stops. The remaining pilot signal variation is compensated by the final repeater 10 in the final station 8.

Conversely, when such a pilot signal variation occurs the lower limiting value of the contact voltmeter 21 is surpassed. The other contact of the contact voltmeter closes, and a series of negative control pulses is applied from the control generator 20 to the control line 22. These pulses cause the control motor 35 in the initial station to rotate in the opposite direction, so that the frequency of signals produced by the oscillator 34 varies. As was explained above, the control impedance 11, 12, 13 of the repeaters 4, 6, 9, will be varied until the pilot level falls within the two limiting values of the contact voltmeter 21. Then the control motor 35 is stopped and the remaining small pilot signal variations are again compensated by the level control of the final repeater 10 in the final station 8. The speed of operation of the level control of the final repeater 10 in the final station 8, is preferably considerably faster than the speed of operation of the level control in the repeaters 4, 6, 9, so that the output level of the final repeater 10 always remains constant within 0.1 db.

In this manner a simple structure and an accurate level control is obtained in the communication system described, in which the level control for pilot signal variations within the limiting values of the contact voltmeter 21, is exclusively effected by the final repeater 10 in the final station 8, while the level control for pilot signal variations outside the limiting values of the contact voltmeter 21 is effected by the repeater 10 in co-operation with the repeaters 4, 6, 9. The repeaters 4, 6, 9 are controlled by the circuit consisting of the contact voltmeter 21, the control generator 20, the control line 22, control motor 35, oscillator 34, and back through the transmission line 3.

The circuit consisting of the contact voltmeter 21, control generator 20, control line 22, control motor 35, oscillator 34, and the return connection to the contact voltmeter 21 by way of the transmission line 2 constitutes a negatively fed-back system, so that the elements employed in the control system need not be critically designed. In particular the quality of the control line 22 and the quality of transmission of the control signal need not be great for an accurate level control. In addition the insensitivity of the stem to interference signals is particularly favourable. The requirements imposed upon the quality of the control line 22 as well as upon the quality of the control signal are even further reduced since in the initial station 3 only a trivalent information signal need be distinguished. In addition, the transmission system is continuously available for the transmission of the control signal. As an example, the period of occurrence of the control signal may be in order of magnitude of hours.

In addition to providing accurate level control, the device described is distinguished by simplicity in structure as well as an extreme noncriticality of the elements used. Many variations are possible in the embodiment of the level control system described. For example, a separate line or a transmission line already used for signal transmission may be used for the cotnrol line 22, while the transmission of the cotnrol signal may be effected, besides by pulses of different polarity, also by means of different frequencies, direct voltages, duration-modulated pulses, pulse series of different pulse cycles, or the like. If required, for the level control of various communication systems, one control line may be used for the transmission of the control signals associated with the various communication systems by using frequency multiplex or time multiplex.

In addition to the advantages described above in the normal operating condition, namely simplicity in structure, independence of the elements used, accurate level control and flexibility, the device according to the invention is also reliable when serious faults occur. In particular, if the control line 22 is interrupted, the control motor 35 cannot be energized so that no variation in the frequency of the oscillator 34 can occur, and accurate level control is maintained. In practice the level control device described is extremely independent of the transmission quality of the control line 22.

In the level control device described, it is also possible in a simple manner to prevent disabling of the whole level control system when the pilot signal fails. For that purpose, a pilot supervision device in the form of a relay 45 is connected to the pilot receiver. When the pilot signal fails, relay 45 blocks actuation of the control generator 20. In the embodiment described this is effected by including a relay contact 46 in the circuit of the grounded central contact of the contact voltmeter 21. If the pilot signal fails, the control generator 20 is cut off by the interruption of the connection of the central contact 30 to ground, as a result of which adjustment of the control motor 35, which would otherwise cause improper operation of the whole level control system, is prevented.

As was already explained, the device according to the invention is extremely reliable in addition to having the advantages already described above. It is to be noted that in addition to choosing the level control signal to be below the transmission band, it is also possible to choose the level control signal to be above that band.

Figure 2:
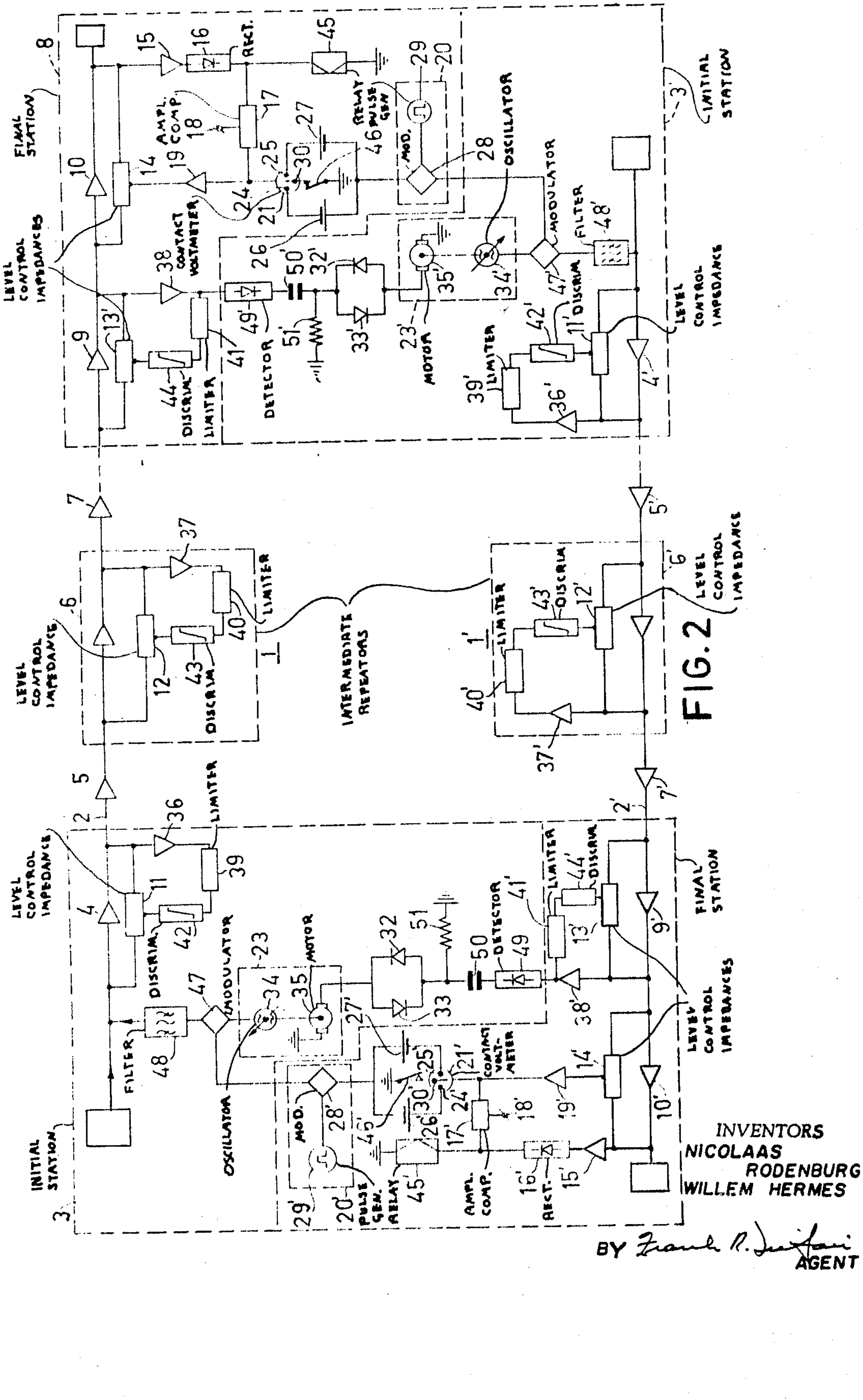
FIGURE 2 shows a communication system for traffic in both directions.

FIGURE 2 shows a further elaboration of the device according to the invention, in which the communication system is constituted by a carrier telephony system 1 for forward traffic and a carrier telephony system 1′ for return traffic. The structure of the two carrier telephony systems substantially correspond to the carrier telephony systems shown in FIGURE 1. Elements of the carrier telephony system 1 and 1′ of FIG. 2 corresponding to those of FIGURE 1, are denoted by the same reference numerals, the element of the carrier telephony system 1′ for return traffic being provided with an accent.

In this device each of the transmission lines, 2, 2′ is used, besides for the transmission of the frequency-modulated level control signal, also for the transmission of the control signal of the carrier telephony system in the other direction. For this purpose, the control signal originating from the control generator 20′, 20 is modulated in amplitude on the level control signal originating from the local oscillator 34, 34′ of the level control voltage generator 23, 23′ as a carrier wave oscillation in an amplitude modulator 47, 47′ with associated output filter 48, 48′ and applied to the transmission lines 2, 2′ for level control of the repeaters 4, 6, 9; 4′, 6′, 9′ and for the control of the control motors 35, 35′ in the level control voltage generators 23, 23′.

The two functions, namely the level control of the repeaters 4, 6, 9; 4′, 6′, 9′ and the control of the control motors 35′, 35, are fulfilled without mutual interference by the output signal of the amplitude modulators 47, 47′ and filters 48, 48′. In fact, on the one hand, no hindrance is experienced by the control signal during the level control of the repeaters 4, 6, 9, 4′, 6′, 9′ by limiting the level control signal modulated in amplitude by the control signal in the limiters 39, 40, 41, 39′, 40′, 41′, while on the other hand the control signal for controlling the contorl motors 35′, 35 is regained in a simple manner by amplitude detection in amplitude detectors 49′, 49. The direct voltage produced in the amplitude detectors 49′, 49 by amplitude detection is suppressed in direct current suppressing networks with series capacitors 50′, 50 and cross-resistors 51′, 51 and applied, in the manner as already described with reference to FIGURE 1, through the threshold devices 32′, 33′, 32, 33 passing current in opposite direction to the control motors 35′, 35. The further operation is quite analogous to that of the device in FIGURE 1, and therefore needs no further explanation.

In this particularly simple manner a transmission of the level control signal and the control signal is obtained without mutual intereference in which these signals can be separated with a minimum of elements.

Finally it is noted that the various elements in the level control system described may also be constructed differently. For example, the marginal supervision device may also be construtced electronically or by making use of a polar relay with central contact and the like, while in addition it is possible, if required, to construct the final repeater 10 with a fixed degree of amplification.

What is claimed is:

1. In a communication system of the type having an initial station, an intermediate station and a final station interconnected in that order by a transmission line, each of said stations including level control means for controlling the gain of the respective station, and wherein said initial station includes a source of a pilot signal connected to apply said pilot signal to said transmission line, and said final station includes pilot receiver means connected to said line at the output of said final station for producing a control signal for controlling the level control means of said stations; the improvement comprising control line means interconnecting said initial and final stations, said final station further comprising control generator means, control circuit means connected to said pilot receiver means, said control circuit means comprising a marginal supervision device, means connecting said control circuit means to control the application of the output of said control generator means to said control line, whereby said control generator means applies a trivalent control signal to said control line, the state of said trivalent control signal being responsive to the level of said first mentioned control signal above, between or below to first and second predetermined levels, said initial station further comprising local level control signal generator means connected to receive said trivalent control signal and apply a level control signal to said transmission line having a characteristic depending upon the statute of said trivalent control signal, said control signal generator comprising memory means for maintaining the previously attained characteristic of said level control signal during one state of said trivalent control signal, and said level control means in said initial and repeater stations each comprise means responsive to said characteristic of said level control signal for controlling the gain of the respective stations.

2. In a communication system of the type comprising an initial station, an intermediate station and a final station interconnected in that order by transmission line means, wherein each of said stations includes adjustable level control means for controlling the gain of the respective station, said initial station includes means for applying pilot signals to said transmission line, said final station includes pilot receiver means connected to receive said pilot signals and produce a first control signal responsive to the amplitude of received pilot signals, and said sytsem further includes control line means interconnecting said initial and final stations; the improvement wherein said final station further comprises control signal generator means responsive to the level of said first control signal for producing a trivalent control signal having a first characteristic when said first control signal is above a first gain level, a second characteristic when said first control signal is below a second given level, and a third characteristic when said first control signal is between said first and second levels, and means applying said trivalent control signal to said control line, said initial station further comprising local level control signal generator means connected to receive said trivalent control signal and apply a level control signal to said transmission line, said level control having a characteristic that varies in response to the characteristic of the received trivalent control signal, said control signal generator comprising memory means connetced to maintain said level control signal at its previously attained level when said trivalent control signal has said third characteristic, and said initial and intermediate stations further comprise means responsive to said characteristic of said level control signal on said transmission line connected to control the adjutable level control means of the respective station.

3. The system of claim 2 wherein said final station comprises means for applying said first control signal to the adjustable level control means in said final station for controlling the gain of said final stage.

4. The system of claim 2 wherein said control signal generator means comprises control signal generator means, and marginal supervision device means connected to control the application of the output of said control signal generator to said control line in response to the level of said first control signal.

5. The system of claim 4 wherein said control signal generator comprises a pulse generator, and said marginal supervision device means is converted to control the application of pulses from said pulse generator to said line whereby the three characteristics of said trivalent control signal are positive pulses, negative pulses, and the absence of pulses.

6. The system of claim 5 wherein said marginal supervision device means comprises a contact voltmeter, comprising a push-pull modulator connected to apply the output of said pulse generator to said control line, first and second direct voltage sources, and means connecting the terminal contacts of said voltmeter to said modulator by way of said direct voltage sources with opposite polarity.

7. The system of claim 2 wherein said final station comprises pilot signal responsive means connected to prevent operation of said control signal generator means in the absence of said pilot signals at the output of said final station.

8. The system of claim 2 wherein said level control signal generator means comprises oscillator means for producing said level control signal, and said memory means comprises control motor means responsive to said trivalent signal connected to control the frequency of said oscillator means.

9. The system of claim 2 wherein said final station further comprises first and second repeaters connected to said transmission line in that order and having first and second adjustable level control means respectively, wherein said first adjustable level control means comprises means responsive to said characteristic of said level control signal for controlling the gain of said first repeater, and means applying said first control signal to said second adjustable level control means for controlling the gain of said second repeater.

10. The system of claim 2 wherein said control line comprises the transmission line of a second communication system substantially identical to said first mentioned system, said first and second systems being connected for transmission in oppoiste directions.

11. The system of claim 10 wherein the control line of said second system comprises the transmission line of said first system, comprising means for amplitude modulating the trivalent control signals of said first and second systems on the level control signals of said second and first systems respectively before application to the transmission lines of said second and first systems respectively.

12. The system of claim 11 wherein said trivalent signals are pulsatory signals, comprising demodulator means in the initial stages of said first and second systems connected to demodulate signals from the transmission lines of said second and first systems respectively for application to the level control generator means of said first and second systems respectively.

References Cited

UNITED STATES PATENTS

| | | | |
|---|---|---|---|
| 1,438,219 | 12/1922 | Clark | 333—15 |
| 1,642,499 | 9/1927 | Jamner | 333—16 |
| 1,734,219 | 11/1929 | Lorance | 333—16 |
| 2,300,366 | 10/1942 | Blair | 333—16 |
| 2,522,738 | 9/1950 | Bayard et al. | 178—68 |

FOREIGN PATENTS

| | | |
|---|---|---|
| 630,442 | 10/1949 | Great Britain. |

RICHARD MURRAY, Primary Examiner

CARL R. VONHELLENS, Assistant Examiner

U.S. Cl. X.R.

325—41, 42, 62; 333—15, 16